United States Patent [19]
Leidig

[11] 3,849,039
[45] Nov. 19, 1974

[54] RIM POWER HYDRAULIC MOTOR
[76] Inventor: Raymond H. Leidig, Rt. 3, Box 504, Lake Charles, La. 70601
[22] Filed: Mar. 22, 1972
[21] Appl. No.: 237,036

[52] U.S. Cl. ............ 418/165, 180/44 E, 180/65 F, 180/66 F, 192/61
[51] Int. Cl. ............................................ F01c 1/00
[58] Field of Search ............ 418/165; 180/43, 44 E, 180/65 F, 66 F; 192/61

[56] References Cited
UNITED STATES PATENTS

| | | | |
|---|---|---|---|
| 2,147,761 | 2/1939 | Whitcomb | 418/165 |
| 2,371,227 | 3/1945 | Dodge | 418/165 |
| 2,418,123 | 4/1947 | Joy | 180/66 F |
| 2,918,907 | 12/1959 | Hausmann | 180/66 F |
| 3,387,502 | 6/1968 | Le Tourneau | 180/65 F |

Primary Examiner—C. J. Husar
Attorney, Agent, or Firm—Victor J. Evans & Co.

[57] ABSTRACT

A rim power hydraulic motor in which a rim is provided with internal spur teeth meshing with spur gears mounted for rotation in a fixed axial member. The spur gears are driven by hydraulic pressure with the meshing gears of the rim serving as a barrier to the passage of hydraulic fluid thereby. The rim may directly support a multiple V-belt pulley, an automobile tire and wheel or any other object to be rotated by power.

4 Claims, 2 Drawing Figures

RIM POWER HYDRAULIC MOTOR

BACKGROUND OF THE INVENTION

Field of the Invention

The present invention is directed to hydraulic motors and particularly to hydraulic motors which are built into the rim of a rotating member.

SUMMARY OF THE INVENTION

A rim power hydraulic motor in which a generally cylindrical rim is journaled for rotation and has an internal spur gear formed therein meshing with a pair of spur gears journaled in an axial stationary member and arranged to be driven by hydraulic pressure. The hydraulic pressure acts directly on the teeth of the spur gears with the point of mesh with the spur gears of the internal spur gear of the rim serving as a barrier. The meshing of the spur gears with the internal spur teeth of the rim transmits power from the spur gears to the rim.

The primary object of the invention is to provide a self-contained hydraulically driven rim for powering a wheel pulley or the like mounted thereon.

Other objects and advantages will become apparent in the following specification when considered in the light of the attached drawing.

DESCRIPTION OF THE PREFERRED EMBODIMENT

Figure 1:
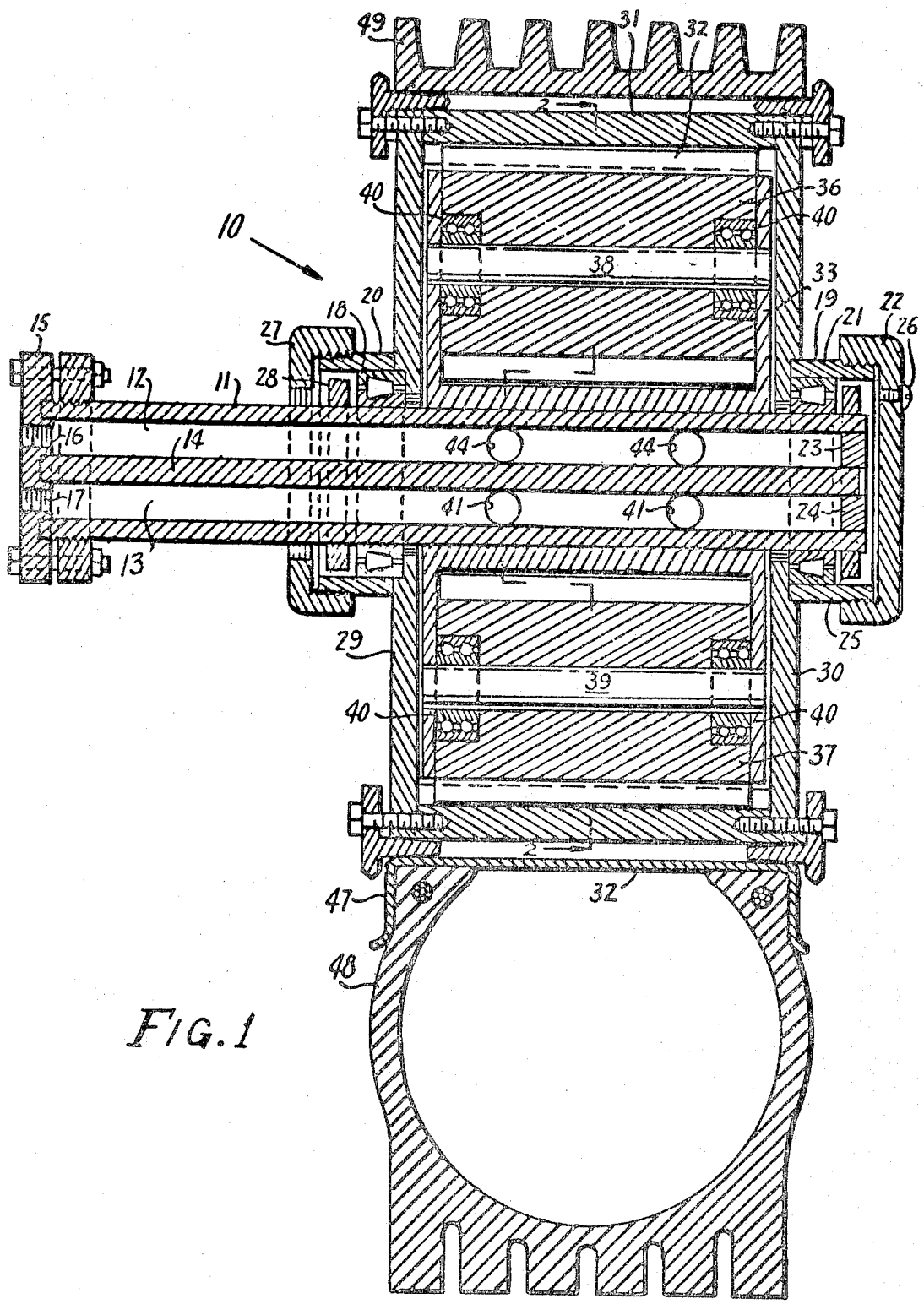
FIG. 1 is a vertical sectional view taken through the invention illustrating both a tire and a multiple V-belt pulley mounted thereon.
Figure 2:
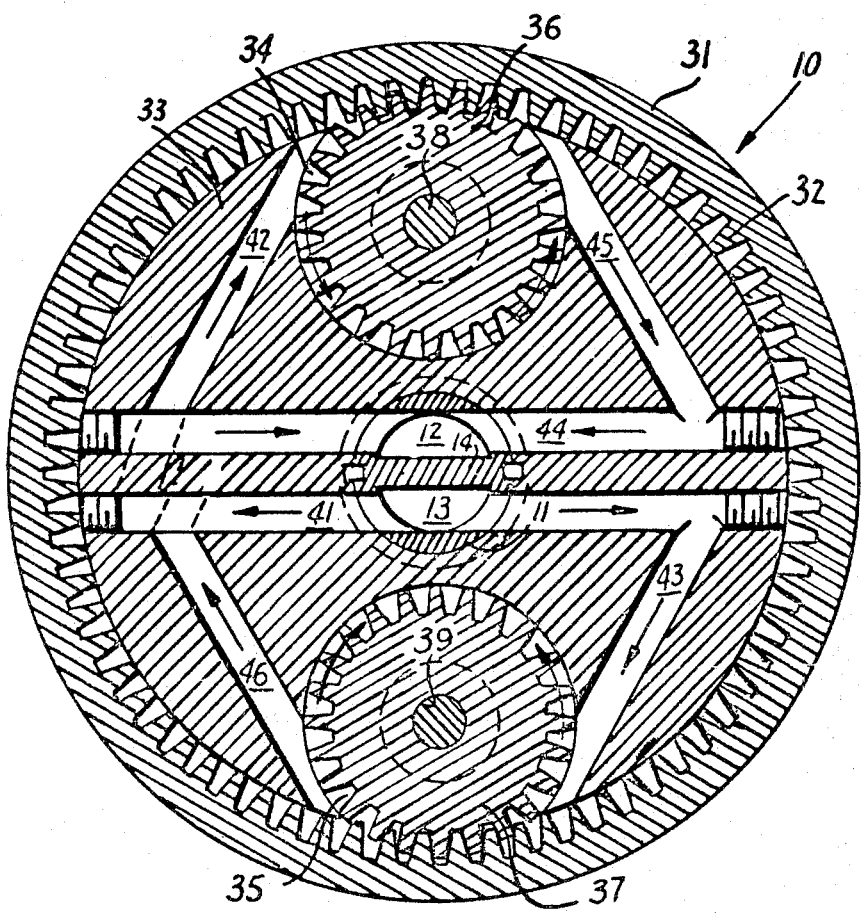
FIG. 2 is a transverse sectional view taken along the line 2—2 of FIG. 1 looking in the direction of the arrows.

Referring now to the drawings in detail wherein like reference characters indicate like parts throughout the several figures the reference numeral 10 indicates generally a rim power hydraulic motor constructed in accordance with the invention.

The rim power hydraulic motor 10 includes a stationary axle 11 having an outlet conduit 12 and an inlet conduit 13 extending completely therethrough and divided by a horizontal partition 14. The axle 11 has an inner end plate 15 carrying a threaded bore 16 communicating with the outlet conduit 12 and a threaded bore 17 communicating with the inlet conduit 13 to permit the attachment of power conduits from a hydraulic pump. Roller bearings 18, 19 are mounted on the axle 11 and support hubs 20, 21 respectively thereon. A hub cap 22 is secured to the hub 21 to protect the bearing 19. Plugs 23, 24 are welded into the outboard ends of the conduits 12, 13 respectively to prevent leakage therefrom. A grease retainer 25 is mounted on the axle 11 to retain grease in the bearing 19. A grease fitting 26 is formed in the hub cap 22 to permit the bearing 19 to be greased without removing the hub cap 22. A cap 27 is secured to the hub 20 and a grease retainer 28 is mounted on the axle 11 to protect the bearing 18.

A circular housing side plate 29 is secured to the hub 20 and is supported on the bearing 18. A second circular housing side plate 30 is secured to the hub 21 and is supported on the bearing 19. The circular side plates 29, 30 are connected at their outer edges by a generally cylindrical rim 31 having a spur gear 32 integrally formed on the inner face thereof. The side plates 29 and 30 are secured to the rim 31 in leak-proof relation.

A generally cylindrical body 33 is mounted on the axle 11 between the side plates 29 and 30 and extends to contact the teeth of the spur gear 32 formed on the rim 31. The body 33 has a pair of transversely extending cylindrical openings 34, 35 formed therein to receive spur gears 36, 37 respectively having their teeth meshing with the spur gear teeth 32. The spur gears 36, 37 are journaled on shafts 38, 39 mounted in the body 33. Bearings 40 support the spur gears 36, 37 on their shafts 38, 39 at opposite ends thereof.

An inlet conduit 41 communicates with the inlet conduit 13 in the axle 11 and extends transversely of the body 33. A conduit 42 extends from the inlet conduit 41 to the spur gear 36 and a conduit 43 extends from the inlet conduit 41 to the spur gear 37. An outlet conduit 44 communicates with the outlet conduit 12 and extends transversely of the body 33. An outlet conduit 45 extends from the spur gear 36 to the outlet conduit 44 and an outlet conduit 46 extends from the spur gear 37 to the outlet conduit 44.

Fluid pressure entering the conduit 13 travels through the conduit 41 through the conduit 42, 43 to the spur gears 37, 38 respectively. The fluid moves the spur gears 37, 38 in their cylinders 34, 35 and causes them to rotate the rim 31 through the meshing of their teeth 32. After the fluid has passed around the spur gears 36, 37 it flows through the outlet conduits 45, 46 into the outlet conduit 44 and into the outlet conduit 12 in the axle 11.

The cylindrical housing 31 may support a conventional rim 47 for holding a pneumatic tire 48 or may support a multiple V-belt pulley 49 whichever is desired.

The weight of the hydraulic motor 10 is completely within the rim 31 so that it is centered on the bearings 18, 19.

Having thus described the preferred embodiment of the invention it should be understood that numerous structural modifications and adaptations may be resorted to without departing from the spirit of the invention.

I claim:

1. A rim power hydraulic motor comprising a fixed hollow axle having an inlet conduit and an outlet conduit for hydraulic fluid under pressure extending therethrough, a generally cylindrical housing journaled for rotation on said axle, a generally cylindrical body rigidly mounted on said axle completely enclosed in said housing, a generally cylindrical internal spur gear formed on said housing surrounding said body, a pair of spur gears mounted in said body and meshing with the spur gear formed on said housing, and conduits within said body communicating with the conduits in said axle for delivering hydraulic fluid to said spur gears and from said spur gears to said axle for driving said spur gears in said body to drive said housing.

2. A device as claimed in claim 1 wherein bearings support said housing on said axle for rotation thereon.

3. A device as claimed in claim 1 wherein said housing supports a pneumatic tire and rim.

4. A device as claimed in claim 1 wherein said housing supports a multiple V-belt pulley.

* * * * *